3,827,898
METHOD OF REDUCING THE RATE OF OXIDATIVE DEGRADATION OF CELLULOSE ETHER
Thomas J. Podlas, Newark, Del., assignor to Hercules Incorporated, Wilmington, Del.
No Drawing. Filed Apr. 6, 1973, Ser. No. 348,837
Int. Cl. C08b *21/26, 27/64*
U.S. Cl. 106—194                                                     11 Claims

ABSTRACT OF THE DISCLOSURE

The rate of degradation of non-ionic cellulose ethers under the influence of a persulfate oxidizing agent is reduced and regulated by the addition of small amounts of a divalent manganese compound into a solution of the ether and the oxidizer.

---

The use of thickened or viscous polymer solutions has become widespread in the oil industry for various secondary recovery and fracturing operations. Among the materials useful in such operations are the water-soluble, non-ionic ethers of cellulose. Such polymers exhibit a good degree of water solubility and in some cases, solubility in other media and relatively small quantities thereof in solution lead to significant viscosity increases. It is frequently desirable to be able, after a time, to decrease or destroy the viscosity of the solution, thus making it free flowing and easily removable from the formation.

In previous work it has been found that polymers of the type herein contemplated can be degraded by means of a persulfate oxidizer. This method of breaking viscosity is extremely rapid, particularly at elevated temperatures such as might be found in a deep oil bearing formation and is thus frequently not totally satisfactory in situations where the high viscosity solution must be maintained for an extended period, say a day or more.

In accordance with this invention, it has been found that the degradation rate of the thickened solution under the influence of a persulfate oxidizer can be decreased and better controlled if there is included in the reactive mixture a small amount of a divalent manganese compound. In brief, the invention comprises a method of controlling the rate of degradation of a non-ionic cellulose ether under the influence of a persulfate oxidizer, which method comprises including in a solution of said cellulose ether and said persulfate a divalent manganese compound which is soluble in said solution.

The process is applicable broadly to soluble, non-ionic cellulose ethers of all viscosity and M.S. levels. Exemplary of these materials are, e.g., methyl cellulose, hydroxyethyl cellulose, hydroxypropyl cellulose and hydroxybutyl cellulose. Mixed cellulose ethers are applicable as well, e.g. ethyl hydroxyethyl cellulose, and hydroxypropyl methyl cellulose. These materials are commercially available in a wide range of substitution levels and they are widely used for thickening and viscosifying solutions.

The persulfate employed in the invention can be any inorganic persulfate. Preferred are the alkali metal persulfates such as sodium persulfate, and, particularly, potassium persulfate. Other persulfates, e.g., ammonium persulfate, can also be employed. Generally the persulfate is present in concentration of about 0.1 to 15% by weight based on the amount of polymer present, although persulfate concentration, *per se* is not the critical factor. What is particularly important is the molar ratio of manganous ion to persulfate ion. The time required to reach a preselected viscosity conidtion varies directly with the ratio of manganese ion to persulfate ion in the system. In most cases, a molar ratio of manganese to persulfate between about 0.001 and 1 will provide adequate control over degradation.

The mechanism by which the persulfate breaks the viscosity of the polymer solution is believed to involve breakdown of the polymer chain, undoubtedly via an oxidation reaction, although the point in the chain where the breakdown occurs is not known with certainty. The viscosity can be decreased by this technique virtually to that of the solvent.

Any ionizable salt of divalent manganese can be employed in the process of this invention to control the rate of polymer degradation so long as it is soluble in the solution being treated. Exemplary of such salts are manganous sulfate, manganous chloride, manganous nitrate, and manganous acetate.

In carrying out the process of this invention, it is preferred to prepare first the solution of the copolymer and to add to this a solution containing a mixture of the manganous salt and the persulfate. Inasmuch as the persulfate can react with both of the other components in the system, it is desirable that all mixing of ingredients be effected immediately prior to utilization of the product, e.g., immediately prior to charging the viscous liquid to an oil-bearing formation. Alternatively, the manganous salt can be added to the polymer solution and, following dissolution thereof, a persulfate solution can be added to this mixture. In any event, there is sufficient reactivity between elements of the mxiture that any mixing thereof should be done substantially immediately prior to use.

In the examples which follow, a solution of the specified cellulose ether was prepared and its viscosity was determined at room temperature and at the temperature selected for carrying out the degradation tests. The viscosity was determined by use of a Fann Viscometer, a rotational type instrument in which the fluid is contained in the annular space between two coaxial cylinders. The outer cylinder is driven at a constant rotational velocity and the torque arising from the fluids viscous drag is exerted on the inner cylinder. The torque is rapidly balanced by a helically wound spring and the deflection is read on a calibrated dial.

To the above soltuion there was added the specified amounts of manganous salt and persulfate and the solution was immediately placed in an oven at the selected temperature. The degradation rate was determined by periodically measuring the vscosity and calculating the percentage of original viscosity retained.

EXAMPLES 1–9

In these examples, the cellulose derivative is hydroxyethyl cellulose having an M.S. of 2.5 and a viscosity of 250 cps. in 1% by weight water soltuion. Degradation testing was done at 37° C. on a 1% water solution. Potassium persulfate and manganous sulfate were used as oxidizer and manganous salt, respectively.

|  | Percent $K_2S_2O_8$* | Percent $MnSO_4$* | $Mn^{++}/S_2O_8^=$** | Percent viscosity retention after T. | | | | | | |
|---|---|---|---|---|---|---|---|---|---|---|
|  |  |  |  | 1 hr. | 2 hrs. | 3 hrs. | 4 hrs. | 5 hrs. | 6 hrs. | 17 hrs. |
| Example: |  |  |  |  |  |  |  |  |  |  |
| 1 | 1.67 | 0 | 0 | 88 | 78 | 68 | 56 | 44 | 36 | 20 |
| 2 | 1.67 | 0.1 | 0.11 | 91 | 88 | 85 | 84 | 84 | 84 | 77 |
| 3 | 1.67 | 0.25 | 0.27 | 95 | 91 | 89 | 88 | 87 | 87 | ---- |
| 4 | 2.50 | 0 | 0 | 86 | 74 | 61 | 46 | 34 | 25 | 14 |
| 5 | 2.50 | 0.025 | 0.018 | 90 | 86 | 82 | 79 | 76 | 75 | 36 |
| 6 | 3.33 | 0 | 0 | 87 | 71 | 59 | 43 | 31 | 23 | 11 |
| 7 | 3.33 | 0.05 | 0.027 | 88 | 85 | 83 | 80 | 77 | 74 | 70 |
| 8 | 6.14 | 0 | 0 | 83 | 67 | 46 | 23 | 15 | 10 | 2 |
| 9 | 6.14 | 0.026 | 0.0077 | 90 | 87 | 82 | 80 | 78 | 75 | 24 |

*Percent by weight, based on polymer.
**Mole ratio.
***Overnight.

Reviewing the above data, it is clear that the manganese very definitely slows the rate of degradation. Thus the control examples (Nos. 1, 4, 6, and 8), which contained no divalent manganese, degraded substantially more in a given time than did their respective counterparts containing the same amount of persulfate. As the data show, relatively small amounts of manganese in terms of persulfate have significant effects on the rate of degradation. Note Example 8, e.g., where it is shown that 6.14% persulfate, based on polymer, causes 90% of the viscosity to be lost in six hours (i.e., 10% retention) while the inclusion of 0.026% manganese decreases this to 25% loss (75% retention). A similar pattern is observed throughout.

EXAMPLES 10–16

In these examples, the polymer is the same hydroxyethyl cellulose in 1% solution. Testing was carried out at 42° C. in 1% water solution.

|  | Percent $K_2S_2O_8$ | Percent $MnSO_4$ | $Mn^{++}/S_2O_8^=$ | Percent viscosity retention after T. | | | | | | |
|---|---|---|---|---|---|---|---|---|---|---|
|  |  |  |  | 1 hr. | 2 hrs. | 3 hrs. | 4 hrs. | 5 hrs. | 6 hrs. | 17 hrs. |
| Example: |  |  |  |  |  |  |  |  |  |  |
| 10 | 1.00 | 0 | 0 | 88 | 82 | 80 | ---- | 69 | 63 | 6 |
| 11 | 1.00 | 0.10 | 0.18 | 88 | 82 | 80 | ---- | 76 | 75 | 76 |
| 12 | 1.67 | 0 | 0 | 79 | 57 | 36 | 23 | 15 | 12 | 3 |
| 13 | 1.67 | 0.10 | 0.11 | 85 | 80 | 78 | 75 | 73 | 72 | 72 |
| 14 | 1.67 | 0.25 | 0.27 | 84 | 79 | 80 | 75 | 74 | 72 | 72+ |
| 15 | 3.33 | 0 | 0 | 78 | 51 | 28 | 17 | 11 | 9 | 2 |
| 16 | 3.33 | 0.0105 | 0.0054 | 84 | 76 | 71 | 68 | 62 | 54 | 9 |

EXAMPLES 17–25

These examples employed the same reactants at 55° C. in 1% water solution.

|  | Percent $K_2S_2O_8$ | Percent $MnSO_4$ | $Mn^{++}/S_2O_8^=$ | Percent viscosity retention after T. | | | | | | |
|---|---|---|---|---|---|---|---|---|---|---|
|  |  |  |  | 1 hr. | 2 hrs. | 3 hrs. | 4 hrs. | 5 hrs. | 6 hrs. | 17 hrs. |
| Example: |  |  |  |  |  |  |  |  |  |  |
| 17 | 0.167 | 0 | ---- | 79 | 64 | 48 | 38 | 30 | 25 | 1 |
| 18 | 0.167 | 0.15 | 1.62 | 79 | 71 | 69 | 68 | 67 | ---- | 51 |
| 19 | 1.00 | 0 | ---- | 64 | 17 | 6 | 3 | 3 | 2 | 0 |
| 20 | 1.00 | 0.10 | 0.18 | 76 | 66 | 60 | 56 | 55 | 50 | ---- |
| 21 | 3.33 | 0 | ---- | 40 | 9 | 3 | 2 | 1 | 0 | 0 |
| 22 | 3.33 | 0.10 | 0.054 | 77 | 69 | 52 | 37 | 26 | 18 | 0 |
| 23 | 3.33 | 0.20 | 0.11 | 81 | 71 | 61 | 55 | 41 | 31 | 0 |
| 24 | 4.17 | 0 | 0 | 30 | 7 | 2 | 1 | 1 | 0 | 0 |
| 25 | 4.17 | 0.15 | 0.065 | 74 | 62 | 44 | 31 | 19 | 13 | 0 |

EXAMPLES 26–32

These examples employed the same reactants at 69° C. in 1% water solution.

|  | Percent $K_2S_2O_8$ | Percent $MnSO_4$ | $Mn^{++}/S_2O_8^=$ | Percent viscosity retention after T. | | | | | | |
|---|---|---|---|---|---|---|---|---|---|---|
|  |  |  |  | 1 hr. | 2 hrs. | 3 hrs. | 4 hrs. | 5 hrs. | 6 hrs. | 17 hrs. |
| Example: |  |  |  |  |  |  |  |  |  |  |
| 26 | 0.167 | 0 | ---- | 60 | 21 | 11 | 9 | 9 | 9 | 4 |
| 27 | 0.167 | 0.15 | 1.62 | 66 | 57 | 54 | 52 | 47 | 44 | 10 |
| 28 | 1.00 | 0 | ---- | 42 | 7 | 1 | 0 | 0 | 0 | 0 |
| 29 | 1.00 | 0.1 | 0.18 | 66 | 50 | 18 | 7 | 3 | 1 | 0 |
| 30 | 1.00 | 0.5 | 0.9 | 67 | 52 | 40 | 21 | 8 | 5 | 0 |
| 31 | 1.67 | 0 | ---- | 38 | 5 | 0 | 0 | 0 | 0 | 0 |
| 32 | 1.67 | 0.25 | 0.27 | 60 | 39 | 3 | 1 | 0 | 0 | 0 |

EXAMPLES 33–37

These examples employed the same reactants at 85° C. in 1% water solution.

|  | Percent K₂S₂O₈ | Percent MnSO₄ | Mn⁺⁺/S₂O₈⁼ | Percent viscosity retention after T. | | | |
|---|---|---|---|---|---|---|---|
|  |  |  |  | 1½ hrs. | 2½ hrs. | 3½ hrs. | 4½ hrs. |
| Example: |  |  |  |  |  |  |  |
| 33 | 0.083 | 0 | ---- | 38 | 18 | 15 | 15 |
| 34 | 0.083 | 0.10 | 2.16 | 56 | 45 | 32 | 27 |
| 35 | 0.083 | 0.5 | 10.8 | 57 | 49 | 40 | 38 |
| 36 | 1.00 | 0 | ---- | 24 | 2 | 0 | 0 |
| 37 | 1.00 | 0.1 | 0.18 | 61 | 32 | 1 | 0 |

EXAMPLES 55-59

In these examples a 1% water solution of the hydroxyethyl cellulose described above was treated at 37° C. The persulfate oxidizer was potassium persulfate and various manganous salts were used.

|  | Percent K₂S₂O₈ | Mn Salt | Conc. | Mn⁺⁺/S₂O₈⁼ | Percent viscosity retention after T. | | | |
|---|---|---|---|---|---|---|---|---|
|  |  |  |  |  | 1 hr. | 2 hrs. | 4 hrs. | 24 hrs |
| Example: |  |  |  |  |  |  |  |  |
| 55 | 6.14 | None | 0 | ---- | 88 | 74 | 33 | 1 |
| 56 | 6.14 | Sulfate | 0.026 | 0.0077 | 98 | 95 | 86 | 13 |
| 57 | 6.14 | Chloride | 0.022 | 0.0077 | 96 | 91 | 87 | 17 |
| 58 | 6.14 | Nitrate | 0.031 | 0.0077 | 94 | 89 | 85 | 17 |
| 59 | 6.14 | Acetate | 0.030 | 0.0077 | 97 | 92 | 87 | 15 |

EXAMPLES 38-44

In these examples a 0.75% water solution of hydroxypropyl cellulose having an M.S. of about 4 and a 1% water viscosity of 150 cps. was employed as the polymer. Potassium persulfate and manganous sulfate were the oxidizer and manganese compound respectively.

|  | Percent K₂S₂O₈ | Percent MnSO₄ | Mn⁺⁺/S₂O₈⁼ | Temperature was 25° C., percent viscosity retention after T. | | | | | |
|---|---|---|---|---|---|---|---|---|---|
|  |  |  |  | ½ hr. | 1½ hrs. | 2½ hrs. | 3½ hrs. | 4½ hrs. | 21 hrs. |
| Example: |  |  |  |  |  |  |  |  |  |
| 38 | 2.22 | 0 | ---- | 98 | 84 | 71 | 63 | 46 | 12 |
| 39 | 2.22 | 0.33 | 0.27 | 97 | 90 | 79 | 76 | 67 | 57 |
| 40 | 2.22 | 0.66 | 0.54 | 100 | 91 | 84 | 78 | 74 | 64 |
| 41 | 2.22 | 1.33 | 1.08 | 99 | 96 | 88 | 87 | 82 | 71 |

|  | Percent K₂S₂O₈ | Percent MnSO₄ | Mn⁺⁺/S₂O₈⁼ | Time x | | | | | |
|---|---|---|---|---|---|---|---|---|---|
|  |  |  |  | 1 | 3 | 4 | 5 | 6 | 24 | 48 |
| 42 | 7.78 | 0 | ---- | 87 | 56 | 47 | 35 | 30 | 6.2 | 4 |
| 43 | 7.78 | 0.0134 | 0.0032 | 97 | 87 | 85 | 80 | 76 | 30 | 12 |
| 44 | 7.78 | 0.067 | 0.0154 | 97 | 92 | 92 | 90 | 90 | 70 | 51 |

EXAMPLES 45-49

These examples employed a 1% water solution of the hydroxypropyl cellulose employed above at 37° C.

|  | Percent K₂S₂O₈ | Percent MnSO₄ | Mn⁺⁺/S₂O₈⁼ | Percent viscosity retention after T. | | | | | |
|---|---|---|---|---|---|---|---|---|---|
|  |  |  |  | 1 hr. | 2 hrs. | 3 hrs. | 4 hrs. | 5 hrs. | 5 hrs. | 24 hrs. |
| Example: |  |  |  |  |  |  |  |  |  |
| 45 | 1.67 | 0 | 0 | 90 | 76 | 57 | 42 | 29 | 22 | 6 |
| 46 | 1.67 | 0.01 | 0.011 | 95 | 91 | ---- | 80 | 73 | 68 | 13 |
| 47 | 1.67 | 0.02 | 0.022 | 94 | 92 | ---- | 83 | 78 | 76 | 32 |
| 48 | 1.67 | 0.10 | 0.11 | 94 | 92 | 91 | 90 | 90 | 91 | 74 |
| 49 | 1.67 | 0.25 | 0.27 | 94 | 93 | 91 | 90 | 89 | 90 | 74 |

EXAMPLES 50-54

In these examples a 1.5% water solution of methyl cellulose having 190 cps. viscosity was employed as the polymer at 37° C.

|  | Percent K₂S₂O₈ | Percent MnSO₄ | Mn⁺⁺/S₂O₈⁼ | Percent viscosity retention after T. | | | | | | | | |
|---|---|---|---|---|---|---|---|---|---|---|---|---|
|  |  |  |  | 1 hr. | 2 hrs. | 3 hrs. | 4 hrs. | 5 hrs. | 6 hrs. | 19 hrs. | 24 hrs. | 48 hrs. |
| Example: |  |  |  |  |  |  |  |  |  |  |  |  |
| 50 | 4.1 | 0 | ---- | 72 | 45 | 30 | 24 | 21 | 17 | ---- | 3 | 0 |
| 51 | 4.1 | 0.035 | 0.0015 | 79 | 61 | 45 | 31 | 24 | 21 | ---- | 3 | 0 |
| 52 | 4.1 | 0.070 | 0.0031 | 81 | 68 | 58 | 46 | 39 | 29 | ---- | 48 | 0 |
| 53 | 4.1 | 0.35 | 0.015 | 81 | 74 | 73 | 66 | 63 | 61 | 18 | 15 | 5 |
| 54 | 4.1 | 1.05 | 0.045 | 80 | 76 | 74 | ---- | ---- | ---- | 38 | 35 | 15 |

EXAMPLES 60–64

In these examples the same hydroxypropyl cellulose solution was treated at 37° C. The persulfate oxidizer was ammonium persulfate and various manganous salts were used.

|  | Percent $(NH_4)_2S_2O_8$ | Mn Salt | Conc. | $Mn^{++}/$ $S_2O_8^=$ | Percent viscosity retention | | | | |
|---|---|---|---|---|---|---|---|---|---|
|  |  |  |  |  | 1 hr. | 2 hrs. | 4 hrs. | 5 hrs. | 6 hrs. |
| Example: |  |  |  |  |  |  |  |  |  |
|  | 5.2 | None | 0 |  | 80 | 59 | 22 | 14 | 11 |
|  | 5.2 | Sulfate | 0.026 | 0.0077 | 87 | 85 | 80 | 77 | 75 |
|  | 5.2 | Chloride | 0.022 | 0.0077 | 87 | 85 | 78 | 78 | 75 |
| 63 | 5.2 | Acetate | 0.030 | 0.0077 | 91 | 87 | 81 | 79 | 76 |
| 64 | 5.2 | Nitrate | 0.031 | 0.0077 | 85 | 85 | 77 | 76 | 73 |

The invention has been described hereinabove with particular reference to water systems. It is applicable, however, to all systems wherein the polymer and the persulfate are soluble. The only limitation is that the manganous salt must be sufficiently soluble to liberate the requisite manganous ion. This is illustrated in the following examples.

EXAMPLES 65–67

In these examples, a 1.5% methanol solution of hydroxypropyl cellulose of the type used in Examples 36 to 47 was treated with ammonium persulfate and manganous salts as indicated at 45° C. The ammonium persulfate was added as a 30% solution in water.

|  | Percent $(NH_4)_2S_2O_8$ | Mn Salt | Conc., percent | $Mn^{++}/$ $S_2O_8^=$ | percent viscosity retention after T | | | | | |
|---|---|---|---|---|---|---|---|---|---|---|
|  |  |  |  |  | 1 hr. | 2 hrs. | 4 hrs. | 5 hrs. | 6 hrs. | 24 hrs. |
| Example: |  |  |  |  |  |  |  |  |  |  |
| 65 | 33⅓ | None | 0 |  | 90 | 91 | 37 | 33 | 34 | 29 |
| 66 | 33⅓ | Chloride | 19.1 | 0.76 | 87 | 87 | 79 | 74 | 31 | 36 |
| 67 | 33⅓ | Acetate | 14.1 | 0.77 | 89 | 89 | 88 | 86 | 86 | 71 |

What I claim and desire to protect by Letters Patent is:

1. A method for controlling the rate of degradation of a non-ionic cellulose ether under the influence of a persulfate oxidizer which comprises incorporating an ionizable salt of divalent manganese into a solution of said cellulose ether containing about 0.1 to 15% by weight of said persulfate based on the weight of cellulose ether, said manganese salt being soluble in said solution, the molar ratio of divalent manganese to persulfate being between about 0.001 and 1.

2. The method of claim 1 wherein the salt of divalent manganese is manganous sulfate and the persulfate is potassium persulfate.

3. The method of claim 1 where the cellulose ether is hydroxypropyl cellulose.

4. The method of claim 1 where the cellulose ether is hydroxyethyl cellulose.

5. The method of claim 1 where the cellulose ether is methyl cellulose.

6. A method for controlling the rate of degradation of a non-ionic water-soluble cellulose ether under the influence of a persulfate oxidizer which comprises incorporating a water-soluble, ionizable salt of divalent manganese into an aqueous solution of said cellulose ether containing about 0.1 to 15% by weight of said persulfate based on the weight of cellulose ether, the molar ratio of divalent manganese to persulfate being between about 0.001 and 1.

7. The method of claim 6 where the divalent manganese salt is manganous sulfate and the persulfate is potassium persulfate.

8. The method of claim 6 where the cellulose ether is hydroxyethyl cellulose.

9. The method of claim 6 where the cellulose ether is hydroxypropyl cellulose.

10. The method of claim 6 where the cellulose ether is hydroxypropyl cellulose.

11. A method for controlling the rate of degradation of a non-ionic methanol-soluble cellulose ether under the influence of ammonium persulfate oxidizer which comprises incorporating a methanol-soluble, ionizable salt of divalent manganese into a methanol solution of said cellulose ether containing about 0.1 to 15% by weight of said persulfate based on the weight of cellulose ether, the molar ratio of divalent manganese to persulfate being between about 0.001 and 1.

References Cited

UNITED STATES PATENTS 3,719,663  3/1973  Klug _____ 260—232
3,175,964  3/1965  Watanabe _____ 148—6.16

THEODORE MORRIS, Primary Examiner

U.S. Cl. X.R.

106—197